US011907289B2

(12) United States Patent
Checkley et al.

(10) Patent No.: US 11,907,289 B2
(45) Date of Patent: *Feb. 20, 2024

(54) METHODS, SYSTEMS, AND MEDIA FOR SEARCHING FOR VIDEO CONTENT

(71) Applicant: Google LLC, Mountain View, CA (US)

(72) Inventors: Garen Checkley, San Francisco, CA (US); Bryce Gibson Reid, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,831

(22) Filed: Oct. 25, 2021

(65) Prior Publication Data

US 2022/0043855 A1 Feb. 10, 2022

Related U.S. Application Data

(63) Continuation of application No. 16/229,797, filed on Dec. 21, 2018, now Pat. No. 11,157,555, which is a
(Continued)

(51) Int. Cl.
*G06F 16/735* (2019.01)
*G06F 16/738* (2019.01)
(Continued)

(52) U.S. Cl.
CPC .......... *G06F 16/735* (2019.01); *G06F 16/738* (2019.01); *G06F 16/7867* (2019.01); *G06F 16/90324* (2019.01)

(58) Field of Classification Search
CPC ............. G06F 16/90324; G06F 16/735; G06F 16/738; G06F 16/7867
See application file for complete search history.

(56) References Cited

U.S. PATENT DOCUMENTS 6,351,747 B1  2/2002  Urazaov et al.
6,832,039 B1  12/2004  Nami
(Continued)

FOREIGN PATENT DOCUMENTS

CN   1965327    5/2007
CN   102138142   7/2011
(Continued)

OTHER PUBLICATIONS

Decision to Refuse a European Patent Application dated Nov. 29, 2018 in EP Patent Application No. 15733967.2.
(Continued)

*Primary Examiner* — Etienne P Leroux
(74) *Attorney, Agent, or Firm* — Shumaker & Sieffert, P.A.

(57) ABSTRACT

Methods, systems, and media for searching for video content are provided. In some embodiments, the method comprises: receiving one or more characters entered into a first query field by a user; determining a predicted search query based on the one or more received characters; determining a plurality of suggested search queries based on the one or more received characters; causing the predicted search query to be presented in the first query field and at least a portion of the plurality of suggested search query to be presented in a second query field, wherein the predicted search query is combined with the one or more received characters in the first query field; searching a database of videos based on the predicted search query; causing a plurality of video content items from the database of videos responsive to the predicted search query to be presented; and causing, without user interaction, a first video content item from the plurality of video content items to be played back.

19 Claims, 8 Drawing Sheets

Related U.S. Application Data continuation of application No. 14/743,001, filed on Jun. 18, 2015, now Pat. No. 10,162,889.

(60) Provisional application No. 62/014,065, filed on Jun. 18, 2014.

(51) Int. Cl.
*G06F 16/78* (2019.01)
*G06F 16/9032* (2019.01)

(56) References Cited

U.S. PATENT DOCUMENTS

| | | | |
|---|---|---|---|
| 8,332,748 | B1 | 12/2012 | Karam |
| 8,676,282 | B2 | 3/2014 | Agarwal et al. |
| 8,676,828 | B1 | 3/2014 | Argarwal et al. |
| 8,719,231 | B2 * | 5/2014 | Jotanovic ............... G06F 16/68 707/899 |
| 9,190,110 | B2 * | 11/2015 | Bloch .................... G10H 1/368 |
| 10,162,889 | B2 | 12/2018 | Checkley et al. |
| 11,157,555 | B2 | 10/2021 | Checkley et al. |
| 2005/0240494 | A1 | 10/2005 | Cue et al. |
| 2005/0283468 | A1 | 12/2005 | Kamvar et al. |
| 2007/0050339 | A1 | 3/2007 | Kasperski et al. |
| 2007/0273994 | A1 | 11/2007 | Harada et al. |
| 2008/0154889 | A1 | 6/2008 | Pfeiffer |
| 2012/0047134 | A1 | 2/2012 | Hansson et al. |
| 2012/0284293 | A1 * | 11/2012 | Nierenberg ....... G06F 16/90324 707/E17.014 |
| 2012/0310645 | A1 | 12/2012 | Gruenstein et al. |
| 2013/0041878 | A1 * | 2/2013 | Satyanarayana .... G06F 16/3322 707/706 |
| 2015/0010288 | A1 | 1/2015 | Aggarwal et al. |
| 2015/0043824 | A1 * | 2/2015 | Akhavan Fomani .. G06V 30/32 382/188 |
| 2016/0103830 | A1 * | 4/2016 | Cheong ................ G06F 16/745 715/738 |

FOREIGN PATENT DOCUMENTS

| | | |
|---|---|---|
| CN | 101268463 | 7/2012 |
| CN | 103049495 | 4/2013 |
| CN | 103729351 | 10/2017 |
| WO | WO 2011/123859 | 12/1899 |
| WO | WO 2005106752 | 11/2005 |
| WO | WO 2007024594 | 3/2007 |
| WO | WO 2010005798 | 1/2010 |
| WO | WO 2013164351 | 11/2013 |

OTHER PUBLICATIONS

Examination Report dated Aug. 24, 2020 in GB Patent Application No. 1622095.6.
Examination Report dated Nov. 4, 2020 in IN Patent Application No. 201647041496.
Examination Report dated Nov. 21, 2019 in AU Patent Application No. 2015276993.
HTML5 Doctor, "The Video Element", pp. 1-10, available at: http://html5doctor.com/the-video-element/, last accessed Apr. 9, 2015.
International Search Report and Written Opinion of the International Searching Authority dated Sep. 23, 2014 in International Patent Application No. PCT/US2015/036514.
Lava Communications, "Embedding a Youtube Playlist—What are your autoplay options?", pp. 1-4, available at: http://www.lavacoms.com/2012/01/embedded-youtube-playlist-autoplay/, last accessed Apr. 9, 2015.
Notice of Allowance dated Jun. 30, 2021 in U.S. Appl. No. 16/229,797.
Notice of Allowance dated Aug. 23, 2018 in U.S. Appl. No. 14/743,001.
Office Action dated Feb. 20, 2018 in U.S. Appl. No. 14/743,001.
Office Action dated Mar. 9, 2021 in U.S. Appl. No. 16/229,797.
Office Action dated Jul. 11, 2019 in CN Patent Application No. 201580032471.3.
Office Action dated Jul. 24, 2017 in U.S. Appl. No. 14/743,001.
Office Action dated Aug. 23, 2018 in KR Patent Application No. 10-2016-7036771.
Office Action dated Nov. 8, 2017 in EP Patent Application No. 15733967.2.
Summons to Attend Oral Proceedings and Communication dated May 23, 2018 in EP Patent Application No. 15733967.2.
Summons to Attend Oral Proceedings dated Jun. 7, 2022 in EP Patent Application No. 15733967.2.
Communication pursuant to Rule 161(1) and 162 EPC from counterpart European Application No. 15733967.2 dated Jan. 25, 2017, 3 pp.
International Preliminary Report on Patentability from International Application No. PCT/US2015/036514 dated Dec. 20, 2016, 11 pp.
Minutes of the Oral Proceedings before the Examining Division from counterpart European Application No. 15733967.2 Nov. 29, 2018, 14 pp.
Notice of Grant from counterpart Australian Application No. 2015276993 dated Jun. 11, 2020, 2 pp.
Prosecution History from U.S. Appl. No. 14/743,001, now issued U.S. Pat. No. 10,162,889, dated Jul. 24, 2017 through Oct. 16, 2018, 56 pp.
Prosecution History from U.S. Appl. No. 16/229,797, now issued U.S. Pat. No. 11,157,555, dated Mar. 9, 2021 through Jul. 12, 2021, 46 pp.
Response to Communication pursuant to Article 94(3) EPC dated Nov. 8, 2017, from counterpart European Application No. 15733967.2 filed Feb. 1, 2018, 35 pp.
Response to Communication Pursuant to Rules 161(1) and 162 EPC dated Jan. 25, 2023, from counterpart European Application No. 15733967.2, filed Aug. 3, 2017, 38 pp.
Response to Examination Report dated Nov. 21, 2019, from counterpart Australian Application No. 2015276993 filed Jan. 31, 2020, 4 pp.
Response to Summons to Attend Oral Proceedings pursuant to Rule 115(1) EPC dated May 23, 2018, including Main Request, from European Patent Application No. 15733967.2, filed Oct. 10, 2018, 28 pp.

* cited by examiner

METHODS, SYSTEMS, AND MEDIA FOR SEARCHING FOR VIDEO CONTENT

CROSS-REFERENCE TO RELATED APPLICATIONS

This application is a continuation of U.S. patent application Ser. No. 16/229,797, filed Dec. 21, 2018, which is a continuation of U.S. patent application Ser. No. 14/743,001, filed Jun. 18, 2015, which claims the benefit of U.S. Provisional Patent Application No. 62/014,065, filed Jun. 18, 2014, each of which is hereby incorporated by reference herein in its entirety.

TECHNICAL FIELD

The disclosed subject matter relates to methods, systems, and media for searching for video content. More particularly, the disclosed subject matter relates to searching for and automatically presenting video content responsive to a predicted search query.

BACKGROUND

Conventional video search systems (e.g., video search engines, video hosting services, etc.) allow a user to search for videos responsive to a search query based on textual metadata associated with each video (e.g., titles, tags, descriptions, etc.). For example, a user can begin by inputting a search query, such as the letters "ca" in the query "cat vacuum video." In this example, the user can be provided with a list of automatically completed queries, such as "cat vacuum," "cat vacuum video," and "cat saves boy from dog." In response to selecting one of the completed queries, the video search system returns a list of links to videos with the search terms contained in their metadata, such as a video entitled "cat plays with vacuum cleaner." The user of the video search system can then select one of the videos in the list to watch.

The user, however, may have to continuously modify the search query and resubmit the modified search query to the video search system to obtain different search results. This can be a time consuming and frustrating procedure for the user, especially when the user may be unaware of the search terms that may lead to the video content that the user is looking for.

Accordingly, it is desirable to provide new mechanisms for searching for video content.

SUMMARY

Methods, systems, and media for searching for video content are provided. In accordance with some embodiments of the disclosed subject matter, a method for searching for video content is provided, the method comprising: receiving one or more characters entered into a first query field by a user; determining a predicted search query based on the one or more received characters; determining a plurality of suggested search queries based on the one or more received characters; causing the predicted search query to be presented in the first query field and at least a portion of the plurality of suggested search query to be presented in a second query field, wherein the predicted search query is combined with the one or more received characters in the first query field; searching a database of videos based on the predicted search query; causing a plurality of video content items from the database of videos responsive to the predicted search query to be presented; and causing, without user interaction, a first video content item from the plurality of video content items to be played back.

In some embodiments, the method further comprises positioning the predicted search query over the one or more received characters.

In some embodiments, in response to receiving additional characters, the method further comprises determining a second predicted search query and a second plurality of suggested search queries based on the one or more characters and the additional characters received from the user.

In some embodiments, the method further comprises causing one or more search queries that have been recently submitted by the user to be presented in response to initiating an application that searches for video content.

In some embodiments, the plurality of suggested search queries includes search queries that have been recently submitted by the user. In some embodiments, the plurality of suggested search queries includes popular search queries. In some embodiments, the plurality of suggested search queries includes search queries associated with popular video content items.

In some embodiments, each suggested search query of the portion of the plurality of suggested search queries that are presented is selectable while the first video content item is being played back. In response to selecting a suggested search query, the method further comprises: inhibiting the playback of the first video content item, searching the database of videos based on the suggested search query, causing a second plurality of video content items from the database of videos responsive to the suggested search query to be presented, and causing, without user interaction, a second video content item from the second plurality of video content items to be played back.

In some embodiments, the first query field is presented in a first horizontal bar and the second query field is presented in a second horizontal bar. In some embodiments, the first horizontal bar is adjacent to the second horizontal bar. In some embodiments, the first horizontal bar and the second horizontal bar are positioned above the plurality of video content items.

In accordance with some embodiments of the disclosed subject matter, a system for searching for video content is provided, the system comprising: a hardware processor that is programmed to: receive one or more characters entered into a first query field by a user; determine a predicted search query based on the one or more received characters; determine a plurality of suggested search queries based on the one or more received characters; cause the predicted search query to be presented in the first query field and at least a portion of the plurality of suggested search query to be presented in a second query field, wherein the predicted search query is combined with the one or more received characters in the first query field; search a database of videos based on the predicted search query; cause a plurality of video content items from the database of videos responsive to the predicted search query to be presented; and cause, without user interaction, a first video content item from the plurality of video content items to be played back.

In accordance with some embodiments of the disclosed subject matter, a non-transitory computer-readable medium containing computer-executable instructions that, when executed by a processor, cause the processor to perform a method for searching for video content is provided, the method comprising: receiving one or more characters entered into a first query field by a user; determining a predicted search query based on the one or more received characters; determining a plurality of suggested search queries based on the one or more received characters; causing the predicted search query to be presented in the first query field and at least a portion of the plurality of suggested search query to be presented in a second query field, wherein the predicted search query is combined with the one or more received characters in the first query field; searching a database of videos based on the predicted search query; causing a plurality of video content items from the database of videos responsive to the predicted search query to be presented; and causing, without user interaction, a first video content item from the plurality of video content items to be played back.

In accordance with some embodiments of the disclosed subject matter, a system for searching for video content is provided, the system comprising: means for receiving one or more characters entered into a first query field by a user; means for determining a predicted search query based on the one or more received characters; means for determining a plurality of suggested search queries based on the one or more received characters; means for causing the predicted search query to be presented in the first query field and at least a portion of the plurality of suggested search query to be presented in a second query field, wherein the predicted search query is combined with the one or more received characters in the first query field; means for searching a database of videos based on the predicted search query; means for causing a plurality of video content items from the database of videos responsive to the predicted search query to be presented; and means for causing, without user interaction, a first video content item from the plurality of video content items to be played back.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

Figure 1:
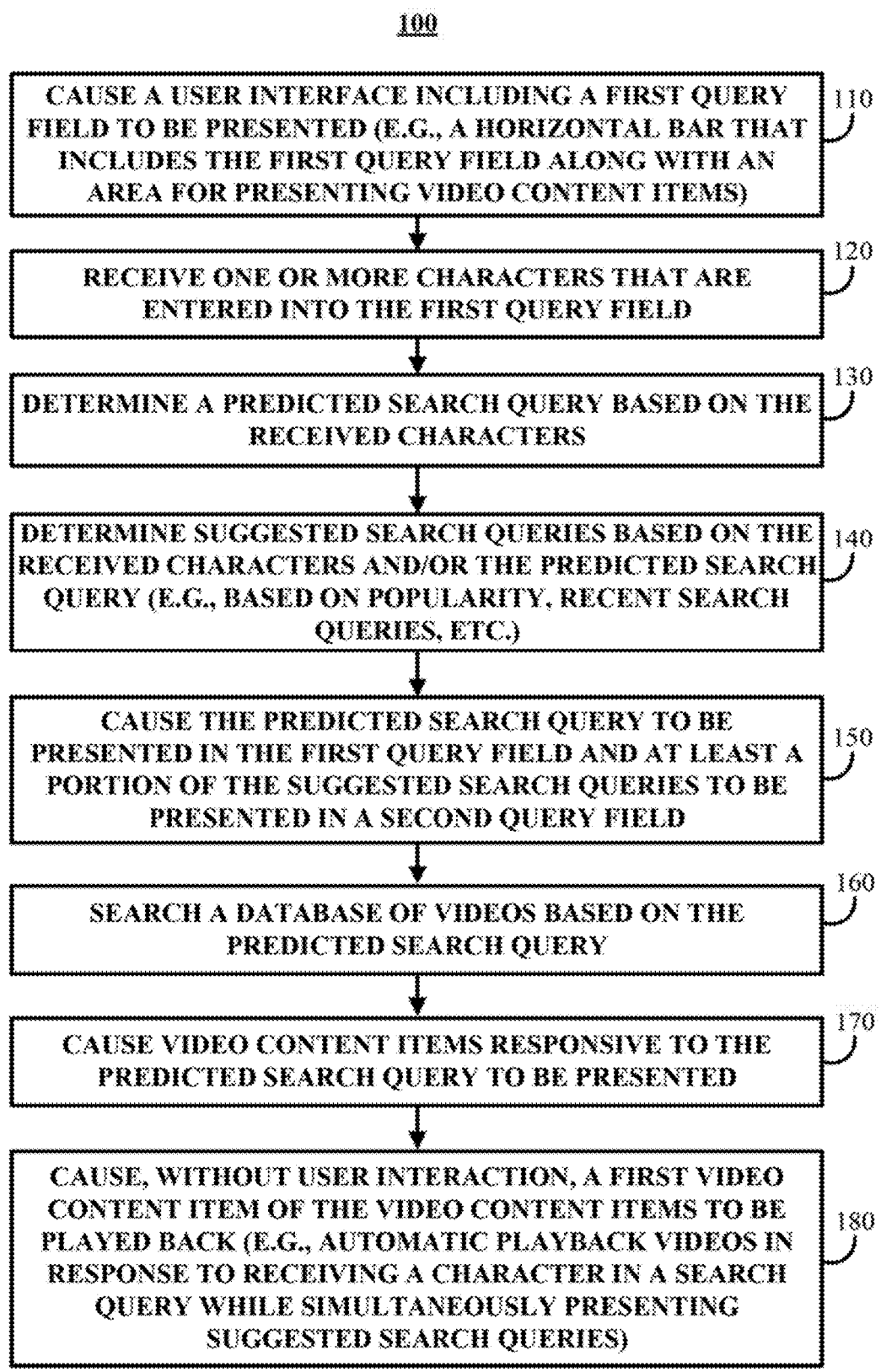
FIG. 1 shows an illustrative example of a process for searching video content in accordance with some embodiments of the disclosed subject matter.

In some embodiments, mechanisms (which can include methods, systems, and media) for searching for video content are provided.

In some embodiments, these mechanisms can receive at least a portion of a search query for video content. For example, the mechanisms can launch a client application on a computing device, such as a mobile phone, a laptop computer, a tablet computer, a wearable computer, a television, etc. The mechanisms can then present multiple user interfaces that allow a user to input a search query using a keypad interface, a user input device (e.g., a microphone, a keyboard, a remote control, a directional pad, etc.), and/or any other suitable input mechanism. In a more particular example, the client application executing on the computing device can receive one or more characters as the start of the search query, such as the letter "a."

In some embodiments, in response to receiving one or more characters, the mechanisms can determine a predicted search query based on the received characters. In response to determining a predicted search query, the mechanisms can present the predicted search query, search a database of videos based on the predicted search query, present video content items that are responsive to the predicted search query, and automatically playback one of the video content items. For example, the mechanisms can present the user with the predicted search query along with a list or a queue containing video content items that are responsive to the predicted search query, where the video content item at the top of the list is automatically played back on the computing device executing the client application.

It should be noted that, in response to receiving additional characters, the mechanisms can predict another search query based on the received characters and, using the revised search query, search a database of videos based on the revised search query, present another set of video content items that are responsive to the revised search query, and automatically playback one of the video content items. It should also be noted that, in response to receiving additional characters, the mechanisms can inhibit the presentation of a video content item, such as a video that is currently being played back, determine a new video content item for presentation based on the revised search query, and automatically playback the new video content item.

Additionally, in some embodiments, in response to receiving one or more characters, the mechanisms can determine suggested search queries based on the received characters. It should be noted that these suggested search queries can be determined based on relevance (e.g., terms relating to the predicted search query, terms relating to related video content, etc.), popularity (e.g., popular search queries, terms relating to popular video content, etc.), recent search queries (e.g., search queries entered by the user in a particular period of time), etc.

In some embodiments, the suggested search queries can be presented simultaneously with the predicted search query and the video content items responsive to the predicted search query. For example, the mechanisms can present the user with the predicted search query in a first horizontal bar, the suggested search queries in a second horizontal bar, and video content items in a results window. In this example, each of the suggested search queries can be selected by the user while a video content item is being played back. In response to receiving an indication that the user has selected a suggested search query, the mechanisms can inhibit the presentation of a video content item, determine a new video content item for presentation based on the suggested search query that has been selected by the user, and automatically playback the new video content item.

It should be noted that, although the embodiments described herein generally describe the search queries as being displayed in a search query field within a horizontal bar, this is merely illustrative. The search queries can be presented using any suitable approach. For example, the suggested search queries can be presented in a scroll bar that allows the user to provide an input (e.g., using a finger, a stylus, or the like) on a touch screen to navigate through different suggested search queries. In another example, the suggested search queries can be presented in a linear menu, where the suggested search queries are ordered by popularity. In yet another example, the suggested search queries can be presented in an overlay that is positioned over the video content item that is currently being played back.

These and other features for searching for video content are described herein in connection with FIGS. 1-8.

Turning to FIG. 1, an illustrative example of a process 100 for searching for video content is shown in accordance with some embodiments of the disclosed subject matter. As shown in FIG. 1, process 100 can begin at 110 by causing a user interface including a first query field to be presented. At 120, one or more characters that are entered by a user of the computing device can be received. The received characters can, in some embodiments, be presented within the first query field as the user of the computing device is inputting them.

Figure 2:
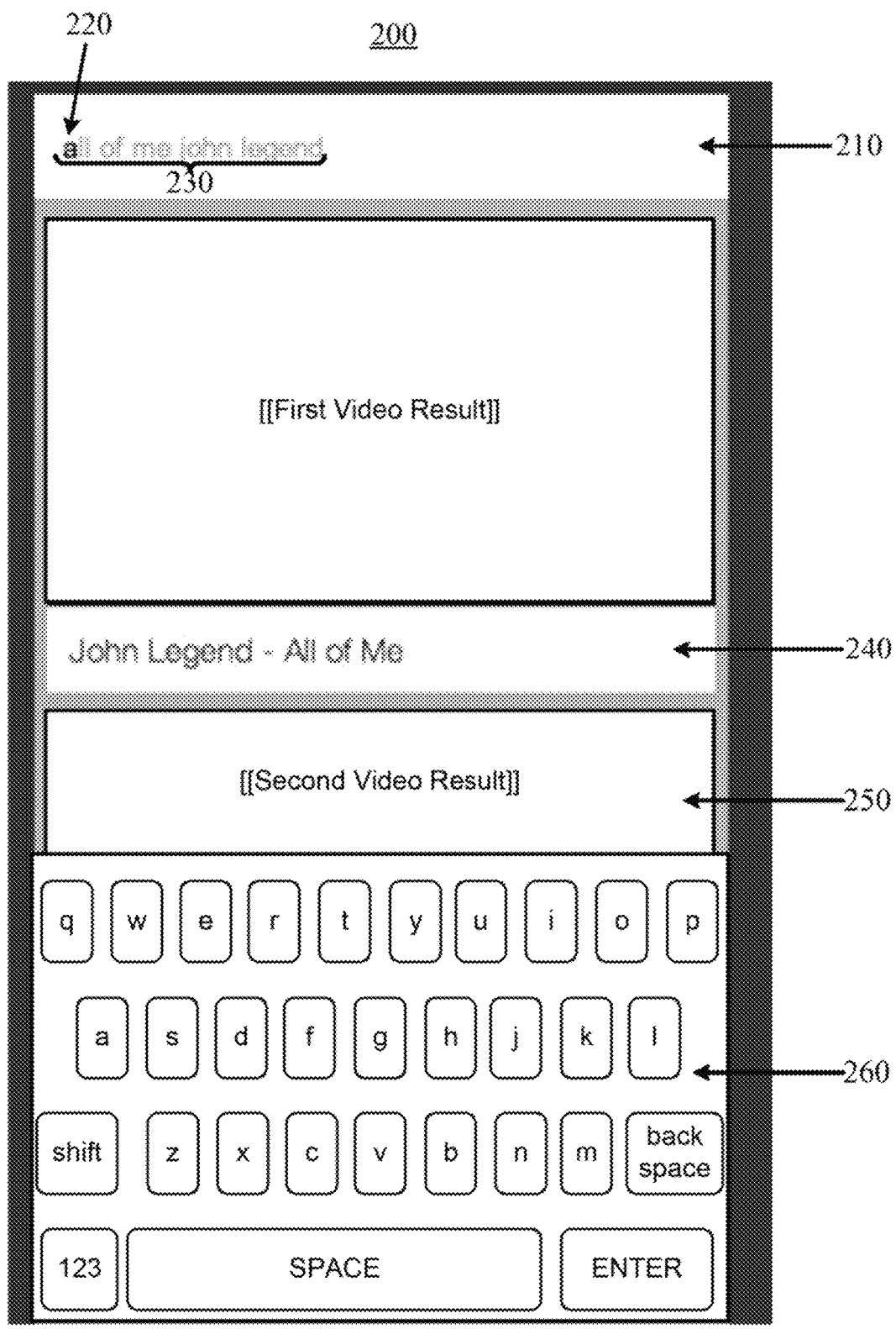
FIG. 2 shows an illustrative example of a user interface that has received a portion of a search query and, in response, provided a predicted search query and video content items responsive to the predicted search query in accordance with some embodiments of the disclosed subject matter.

In a more particular example, FIG. 2 shows an illustrative example of a user interface 200 that includes a first query field 210 for receiving a search query. As shown in FIG. 2, the user of a computing device executing process 100 has inputted the character "a" into first query field 210 using keypad 260.

It should be noted that the search query can include any suitable number of characters, words, phrases, sentences, numbers, and/or any other suitable search terms. In some embodiments, the search query can be composed in one or more different languages.

It should also be noted that the one or more characters of the search query can be received in any suitable manner. In some embodiments, in response to receiving a user input indicative of a user's desire to input a search query (e.g., a user touching or clicking query field 210, a user hovering a pointer over field 210, etc.), the client application can cause a keypad interface 260 to be presented. For example, the client application can allow a user to input a search query by selecting one or more keys of keypad interface 260 using a stylus, the user's fingers, gestures, a remote control, etc. Additionally or alternatively, the client application can receive a voice command issued by a user through an audio input device, such as a microphone.

Referring back to FIG. 1, a predicted search query based on the received characters can be determined at 130. For example, as shown in FIG. 2, in response to receiving the character "a" 220 in first query field 210, the predicted search query 230 of "all of me john legend" has been determined. It should be noted that, in response to inputting additional characters of the search query into first query field 210, process 100 can return to 130 and determine another predicted search query based on the additionally received characters.

It should also be noted that the predicted search query can be determined based on any suitable criterion, such as popularity (e.g., popular search queries matching the characters entered by the user), recent search queries matching the characters entered by the user, etc.

As also shown in FIG. 2, the entered character 220 and the predicted search query 230 can be simultaneously presented within the first search query 210. More particularly, the predicted search query 230 can be superimposed over the entered character 220, where the entered character 220 and the predicted search query are visually differentiated (e.g., the entered character "a" 220 is placed in a bold font within the predicted search query 230). In another example, predicted search query 230 can appear beneath the entered character 220.

Additionally, in some embodiments, process 100 can present the user with suggested search queries. Referring back to FIG. 1, suggested search queries based on the received characters can be determined at 140 and the predicted search query along with the suggested search queries can be presented to the user of the computing device at 150.

It should be noted that these suggested search queries can be determined based on any suitable criterion, such as relevance (e.g., terms relating to the predicted search query, terms relating to related video content, etc.), popularity (e.g., popular search queries, terms relating to popular video content, etc.), recent search queries (e.g., search queries entered by the user in a particular period of time), etc.

Figure 3:
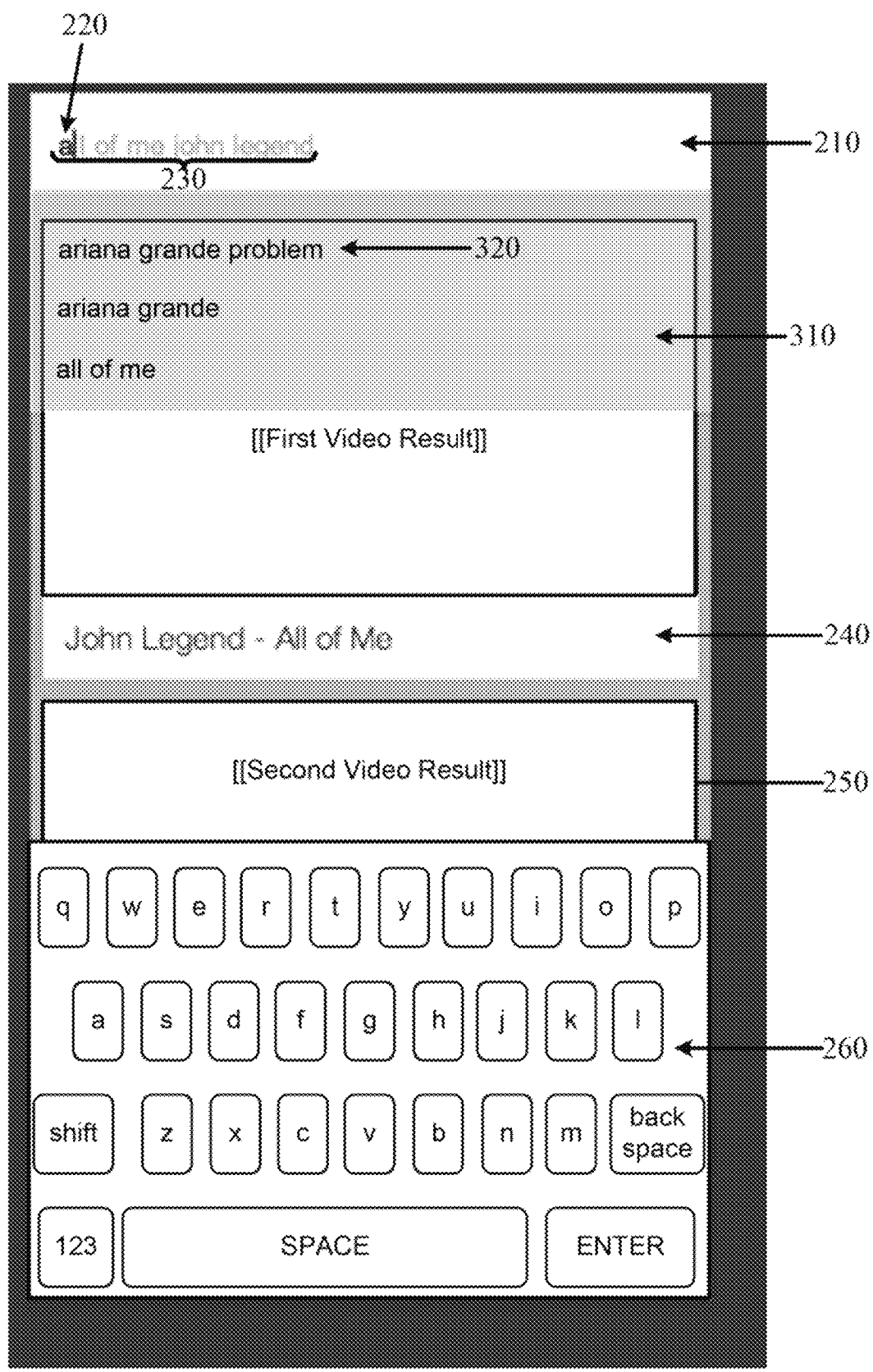
FIG. 3 shows an illustrative example of a user interface that includes suggested search queries in a window that overlays one of the video content items being played back in accordance with some embodiments of the disclosed subject matter.

For example, as shown in FIG. 3, in response to receiving the character "a" 220 in first query field 210, the suggested search queries of "ariana grande problem," "ariana grande," and "all of me" have been determined. Similarly to the predicted search query described above, in response to inputting additional characters of the search query into first query field 210, process 100 can return to 140 and determine another set of suggested search queries based on the additionally received characters. For example, in response to receiving the characters "al" in first query field 210, the suggested search queries of "all of me," "all of you," and "alicia keys" can be determined.

In some embodiments, the suggested search queries can be presented simultaneously with the predicted search query and the video content items responsive to the predicted search query. For example, as shown in FIG. 3, the predicted search query "all of me john legend" 230 can be presented in a first horizontal bar that includes query field 210 and the suggested search queries of "ariana grande problem," "ariana grande," and "all of me" can be presented in a second horizontal bar 310. It should be noted that the suggested search queries listed in second horizontal bar 310 can be overlaid onto a video content item that is currently being played back (e.g., the video entitled "John Legend—All of Me" in a video results region along with other video content items that are responsive to the predicted search query).

It should be noted that the suggested search queries can be presented in any suitable manner. For example, as shown in FIG. 3, the suggested search queries can be listed in horizontal bar 310, where horizontal bar 310 can be overlaid onto the video window of the video content item that is currently being played back and where horizontal bar 310 can be adjacent to a horizontal bar that contains the first query field (e.g., having the predicted search query "all of me john legend").

Figure 4:
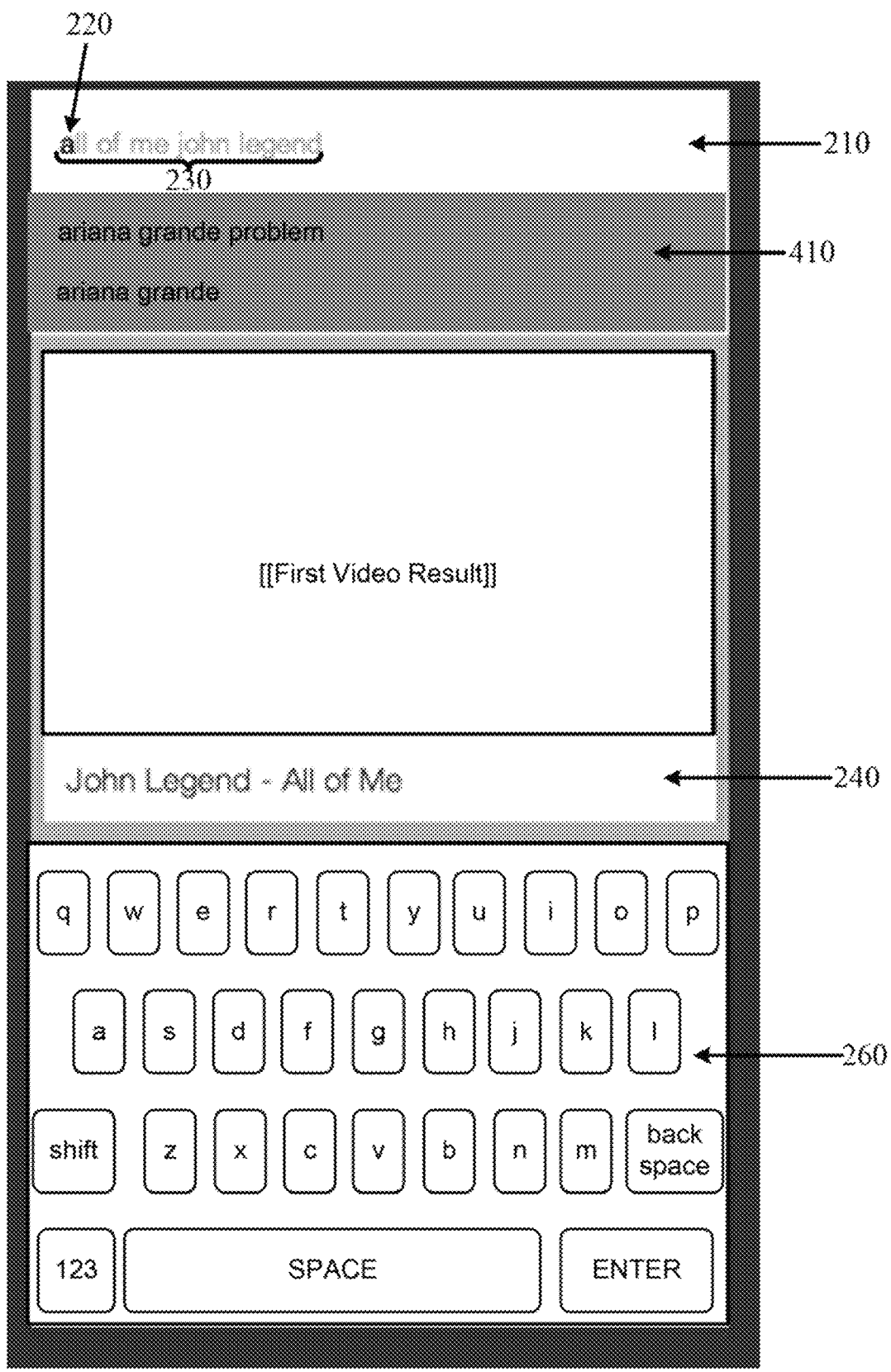
FIG. 4 shows an illustrative example of a user interface that includes suggested search queries in a window adjacent to the predicted search query and one of the video content items being played back in accordance with some embodiments of the disclosed subject matter.

In another example, as shown in FIG. 4, the suggested search queries can be listed in a horizontal region 410, where horizontal region 410 can be positioned between the video window of the video content item that is currently being played back and the horizontal bar that contains the first query field (e.g., having the predicted search query "all of me john legend").

Figure 5:
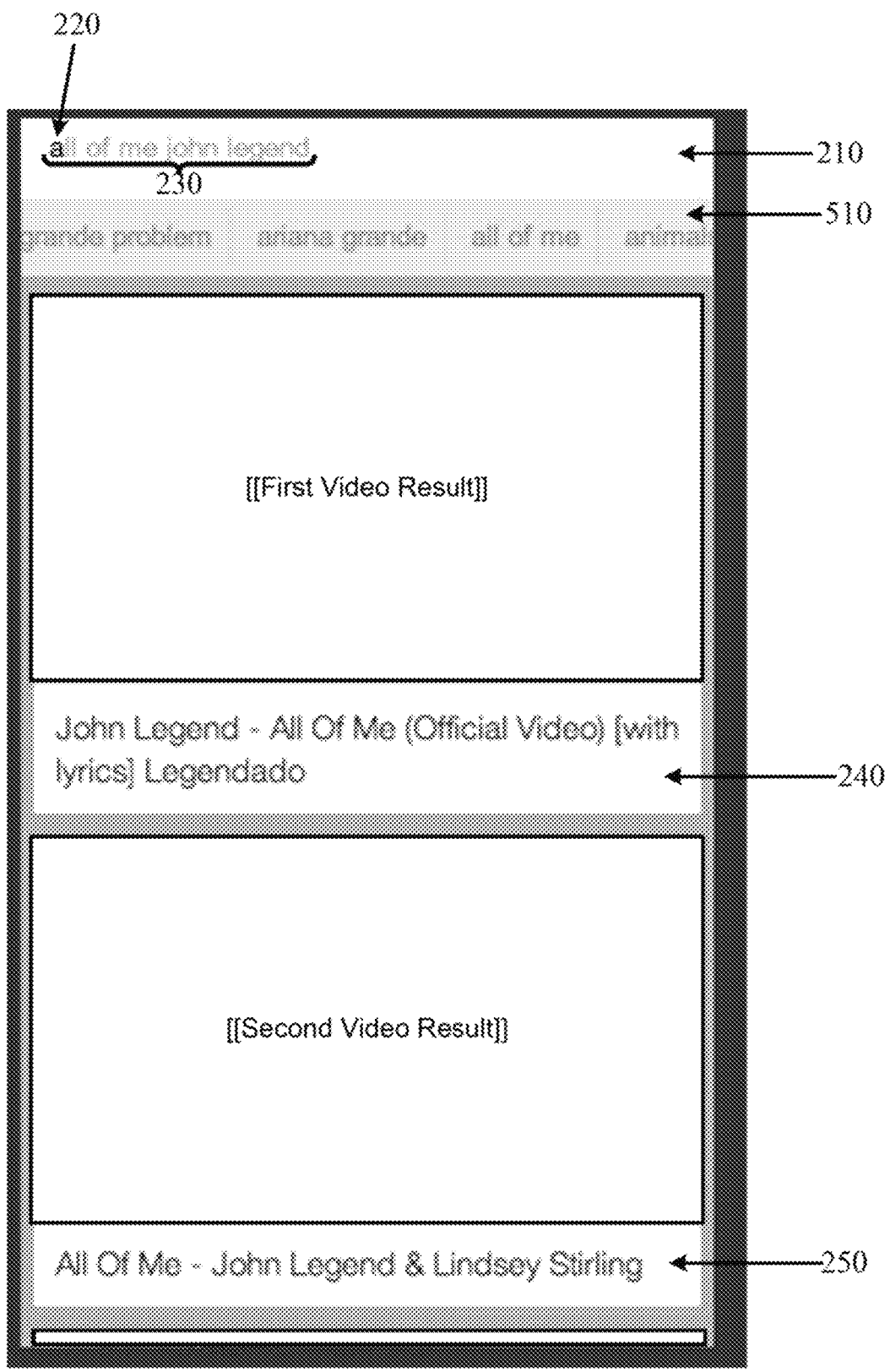
FIG. 5 shows an illustrative example of a user interface that includes suggested search queries in a horizontal scroll bar that is positioned between a horizontal bar containing the predicted search query and the video content item currently being played back in accordance with some embodiments of the disclosed subject matter.
Figure 6:
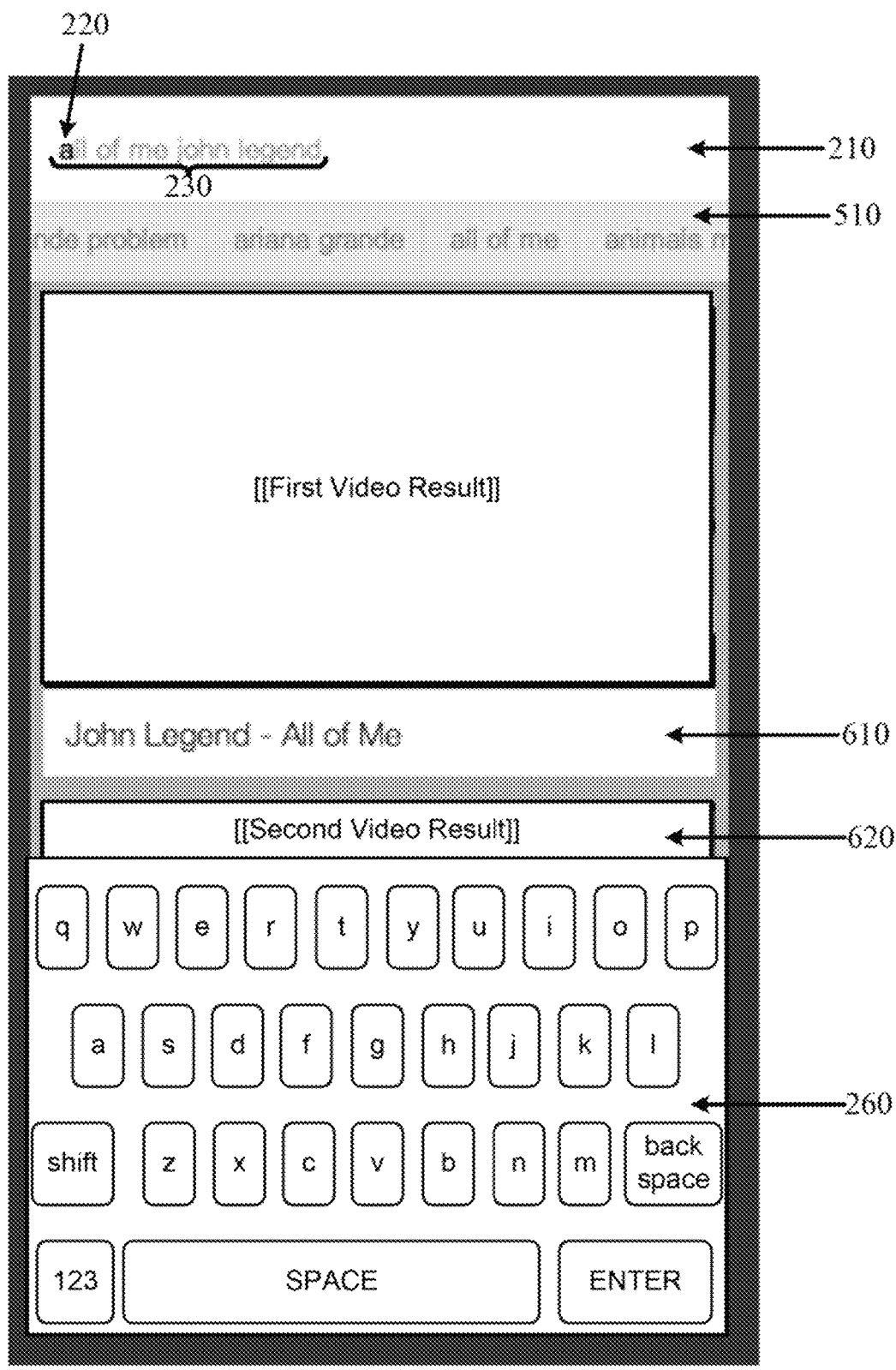
FIG. 6 shows an illustrative example of a user interface that shows, in response to one of the video content items being played to completion, another video content item being subsequently played back in accordance with some embodiments of the disclosed subject matter.

In yet another example, as shown in FIG. 5, the suggested search queries can be placed in a horizontal scroll bar 510, where scroll bar 510 can be positioned between the video window of the video content item that is currently being played back and the horizontal bar that contains the first query field (e.g., having the predicted search query "all of me john legend"). It should be noted that, in some embodiments, all of the suggested search queries can be placed within horizontal scroll bar 510 and the user using a suitable input (e.g. using a finger, a stylus, or the like) onto a touch screen display of the computing device can navigate through the suggested search queries. For example, as shown in FIG. 6, in response to providing directional inputs to the left or right, scroll bar 510 can present the user with different suggested search queries (e.g., "animals as leaders"). It should also be noted that the user of the computing device can interact with the suggested search queries concurrently while a video content item in the list of video search results is being played back. For example, the user using a suitable input can navigate through the suggested search queries in scroll bar 510, while a video in video interface 240 is currently being played back.

In these examples for presenting suggested search queries, each of the suggested search queries can be selected to replace the predicted search query. For example, as shown in FIG. 3, suggested search query 320 that represents the search query "ariana grande problem" can be selected by the user of the computing device. In response to receiving an indication that the user has selected a suggested search query, the video content item being played back in the video search results can stop being presented, a new video content item for presentation based on the suggested search query that has been selected by the user can be determined, and the new video content item in the video search results can be automatically played back to the user of the computing device.

Additionally or alternatively, in response to initiating the client application for searching for video content, suggested search queries that include popular search queries and/or recently entered search queries can be presented to the user along with an empty query field 210.

Referring back to FIG. 1, in response to the predicted search query or the suggested search query that has been selected by the user, process 100 can continue by searching a database of videos based on the search query at 160, causing video content items responsive to the search query to be presented at 170, and cause, without user interaction, a first video content item from the video content items to be played back. For example, a list or queue containing video content items that match the search query can be generated and the first video content item in the list can automatically begin being played back to the user of the computing device. More particularly, process 100 can, in response to receiving one or more characters of a search query into a query field, simultaneously present the user with a predicted search query, suggested search queries, and a list of video content items that match the predicted search query, where the first video into the list of video content items is automatically played back.

As shown in FIGS. 2-6, video interfaces representing video content items can be presented in the user interface, thereby allowing a user to browse and/or navigate through multiple interfaces to select a video content item to consume. These video interfaces can be presented, for example, in a grid of video interface, as a column of video interfaces, and/or using any other suitable technique or techniques. For example, as shown in FIGS. 2-5, the video search results in the list include a video interface 240 for a video entitled "John Legend—All of Me (Official Video) [with lyrics] Legendado" and a video interface 250 for a video entitled "All of Me—John Legend & Lindsey Stirling."

It should be noted that, upon receiving the character "a" 220 in query field 210, process 100 can determine and present predicted search query 220, suggested search queries 410 or 510, and video search results (e.g., video interface 240 and video interface 250), where video interface 240 for the video entitled "John Legend—All of Me (Official Video) [with lyrics] Legendado" automatically begins being played back to the user.

It should be also be noted that, in response to a video being played back to completion, such as the video in video interface 240, process 100 can continue to playback the next video in the list, such as the video entitled "All of Me—John Legend & Lindsey Stirling" in video interface 250.

It should further be noted that, although the embodiments described herein generally relate to searching for video content, this is merely illustrative. These mechanisms described herein can be used to search for any suitable media content. For example, media content can include audio and/or video media content. As another example, media content can include print media content or image media content. As still another example, media content can include a collection of media content, such as a playlist of videos, a playlist of songs, a collection of images, etc. As a further example, media content can include any suitable combination thereof and/or any other suitable media content.

It should be noted that the above steps of the flow diagram of FIG. 1 can be executed or performed in any order or sequence not limited to the order and sequence shown and described in the figure. Also, some of the above steps of the diagram of FIG. 1 can be executed or performed substantially simultaneously where appropriate or in parallel to reduce latency and processing times. Furthermore, it should be noted that diagram of FIG. 1 is provided as an example only. At least some of the steps shown in this figure may be performed in a different order than represented, performed concurrently, or altogether omitted.

Figure 7:
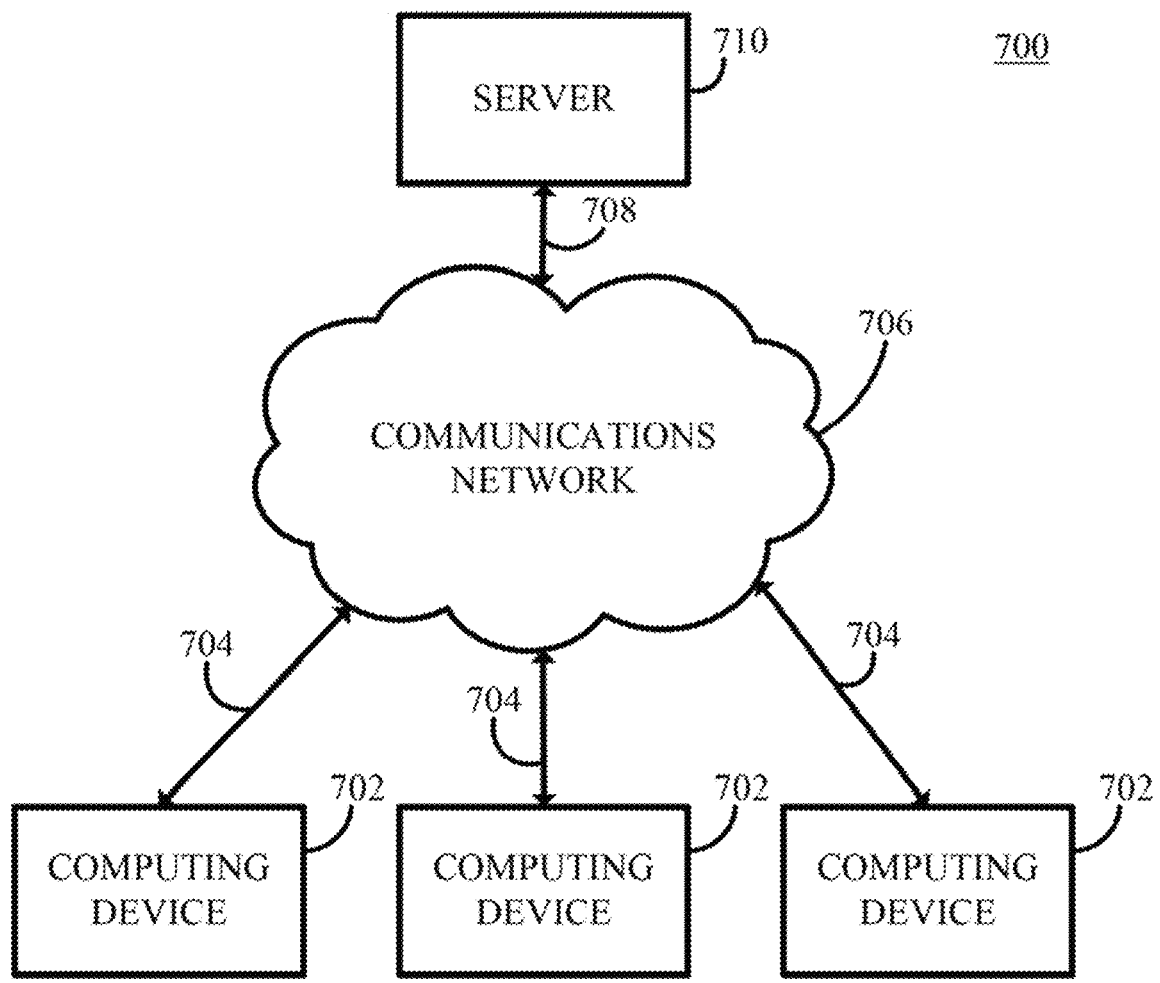
FIG. 7 shows a generalized schematic diagram of an illustrative system for searching for video content in accordance with some embodiments of the disclosed subject matter.

FIG. 7 is a generalized schematic diagram of a system on which the mechanisms for searching for video content can be implemented in accordance with some embodiments of the disclosed subject matter. As illustrated, system 700 can include one or more computing devices 702, such as a user computing device for providing search queries and/or obtaining and playing back media content items from various sources. For example, computing device 702 can be implemented as a personal computer, a tablet computing device, a personal digital assistant (PDA), a portable email device, a multimedia terminal, a mobile telephone, a gaming device, a set-top box, a television, a smart television, a wearable computing device, etc.

In some embodiments, computing device 702 can include a storage device, such as a hard drive, a digital video recorder, a solid state storage device, a gaming console, a removable storage device, or any other suitable device for storing media content, search queries, metadata relating to a particular search domain, etc.

Computing devices 702 can be local to each other or remote from each other. For example, when one computing device 702 is a television and another computing device 702 is a second screen device (e.g., a tablet computing device, a mobile telephone, etc.), the computing devices 702 may be located in the same room. Computing devices 702 are connected by one or more communications links 704 to a communications network 706 that is linked via a communications link 708 to a server 710.

System 700 can include one or more servers 710. Server 710 can be any suitable server for providing access to the client application, such as a processor, a computer, a data processing device, or a combination of such devices. For example, the client application can be distributed into multiple backend components and multiple frontend components or interfaces. In a more particular example, backend components, such as data distribution can be performed on one or more servers 710. Similarly, the graphical user interfaces displayed by the client application, such as a search interface for retrieving media content or an interface for providing search queries, can be distributed by one or more servers 710 to computing device 702.

More particularly, for example, each of the computing devices 702 and server 710 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 702 can be implemented as a personal computer, a tablet computing device, a personal digital assistant (PDA), a portable email device, a multimedia terminal, a mobile telephone, a gaming device, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 7, communications network 706 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 704 and 708 may be any communications links suitable for communicating data between computing devices 702 and server 710, such as network links, dial-up links, wireless links, hard-wired links, any other suitable communications links, or a combination of such links. Computing devices 702 enable a user to access features of the application. Computing devices 702 and server 710 may be located at any suitable location. In one embodiment, computing devices 702 and server 710 may be located within an organization. Alternatively, computing devices 702 and server 710 may be distributed between multiple organizations.

Figure 8:
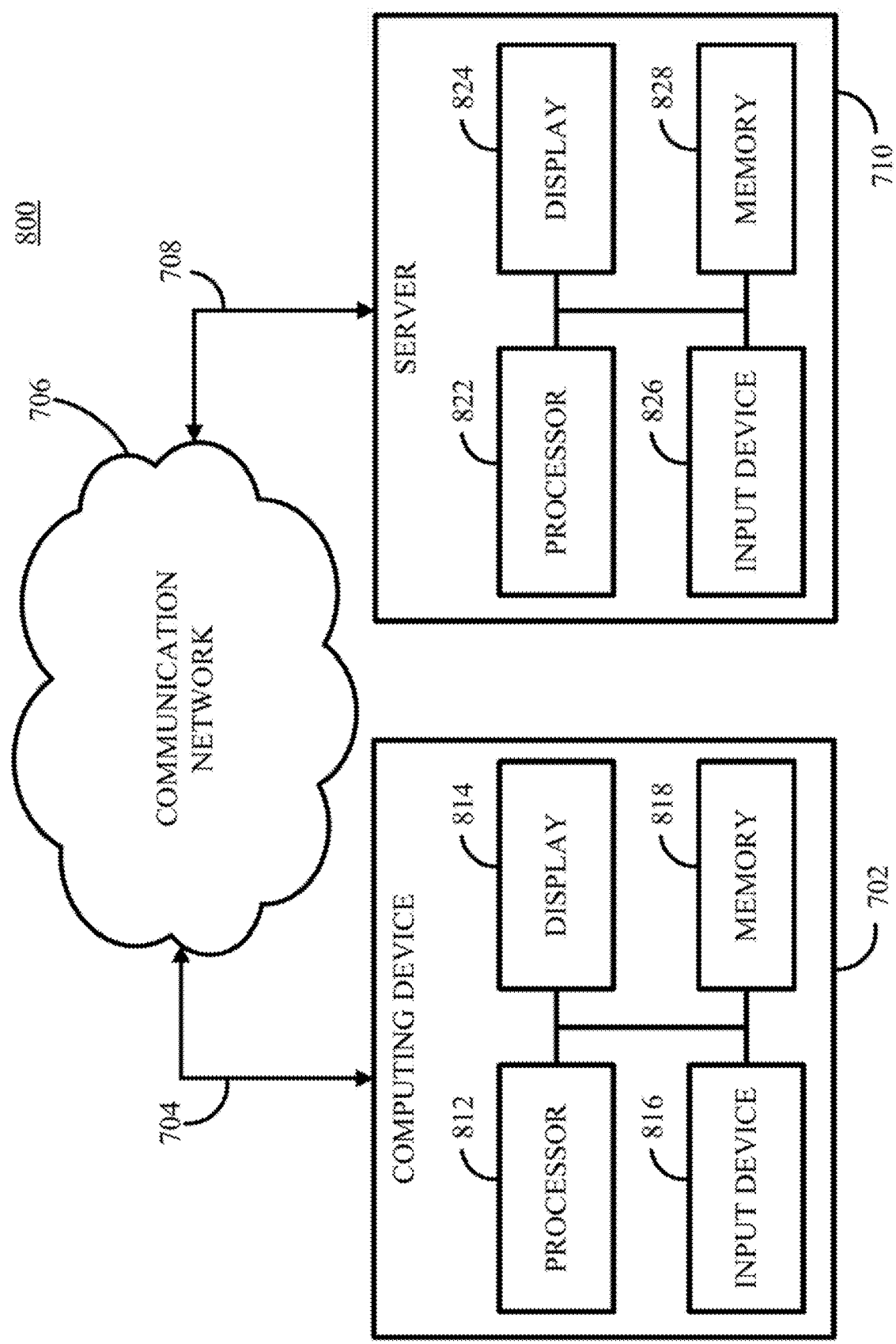
FIG. 8 shows a detailed example of a server and one of the computing devices of FIG. 7 that can be used in accordance with some embodiments of the disclosed subject matter.

Referring back to FIG. 7, the server and one of the computing devices depicted in FIG. 7 are illustrated in more detail in FIG. 8. Referring to FIG. 8, computing device 702 may include processor 812, display 814, input device 816, and memory 818, which may be interconnected. In a preferred embodiment, memory 818 contains a storage device for storing a computer program for controlling processor 812.

Processor 812 uses the computer program to present on display 814 the query interpretation application and the data received through communications link 704 and commands and values transmitted by a user of computing device 702. It should also be noted that data received through communications link 704 or any other communications links may be received from any suitable source. Input device 816 may be a computer keyboard, a mouse, a keypad, a cursor-controller, dial, switchbank, lever, a remote control, or any other suitable input device as would be used by a designer of input systems or process control systems. Alternatively, input device 816 may be a finger or stylus used on a touch screen display 814. For receiving the voice queries described above, input device 816 may be a microphone.

Server 710 may include processor 822, display 824, input device 826, and memory 828, which may be interconnected. In a preferred embodiment, memory 828 contains a storage device for storing data received through communications link 708 or through other links, and also receives commands and values transmitted by one or more users. The storage device further contains a server program for controlling processor 822.

In some embodiments, the application may include an application program interface (not shown), or alternatively, the application may be resident in the memory of computing device 702 or server 710. In another suitable embodiment, the only distribution to computing device 702 may be a graphical user interface ("GUI") which allows a user to interact with the application resident at, for example, server 710.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for searching for video content are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is limited only by the claims that follow. Features of the disclosed embodiments can be combined and rearranged in various ways.

What is claimed is:

1. A method for searching for video content, the method comprising:
   determining (i) a predicted search query based on one or more received characters that have been entered into a first query field and (ii) a suggested search query based on the one or more received characters, wherein the predicted search query and the suggested search query include the one or more received characters;
   causing the predicted search query to be presented in the first query field that is positioned in a first horizontal region and the suggested search query to be presented in a second query field that is positioned in a second horizontal region adjacent to the first horizontal region; and
   in response to selecting one of the suggested search query and the predicted search query, causing a first media content item of a plurality of media content items that are responsive to the selected search query to be presented, wherein a second media content item of the plurality of media content items is presented after the first content item in which the first media content item is inhibited from being presented.

2. The method of claim 1, wherein the suggested search query is selectable by a user while a media content item is being played back.

3. The method of claim 1, further comprising searching a database of media content based on the suggested search query, wherein a plurality of media content items are received from the database of media content.

4. The method of claim 3, further comprising causing, without user interaction, a second video content item from the plurality of video content items to be played back.

5. The method of claim 1, wherein the predicted search query is combined with the one or more received characters in the first query field.

6. The method of claim 1, further comprising positioning the predicted search query over the one or more received characters in the first query field.

7. The method of claim 1, further comprising, in response to receiving additional characters that have been entered into the first query field, determining a second predicted search query and a second suggested search query based on the one or more characters and the additional characters.

8. The method of claim 7, further comprising positioning the second predicted search query over the one or more received additional characters.

9. The method of claim 1, further comprising causing one or more search queries that have been recently submitted by the user to be presented in response to initiating an application that searches for media content.

10. A system for searching for video content, the system comprising:
    a hardware processor that is programmed to:
      determine (i) a predicted search query based on one or more received characters that have been entered into a first query field and (ii) a suggested search query based on the one or more received characters, wherein the predicted search query and the suggested search query include the one or more received characters;
      cause the predicted search query to be presented in the first query field that is positioned in a first horizontal region and the suggested search query to be presented in a second query field that is positioned in a second horizontal region adjacent to the first horizontal region; and
      in response to selecting one of the suggested search query and the predicted search query, cause a first media content item of a plurality of media content items that are responsive to the selected search query to be presented, wherein a second media content item of the plurality of media content items is presented after the first content item in which the first media content item is inhibited from being presented.

11. The system of claim 10, wherein the suggested search query is selectable by a user while a media content item is being played back.

12. The system of claim 10, wherein the hardware processor is further configured to search a database of media content based on the suggested search query, wherein a plurality of media content items are received from the database of media content.

13. The system of claim 12, wherein the hardware processor is further configured to cause, without user interaction, a second video content item from the plurality of video content items to be played back.

14. The system of claim 10, wherein the predicted search query is combined with the one or more received characters in the first query field.

15. The system of claim 10, wherein the hardware processor is further configured to position the predicted search query over the one or more received characters in the first query field.

16. The system of claim 10, wherein the hardware processor is further configured to, in response to receiving additional characters that have been entered into the first query field, determine a second predicted search query and a second suggested search query based on the one or more characters and the additional characters.

17. The system of claim 16, wherein the hardware processor is further configured to position the second predicted search query over the one or more received additional characters.

18. The system of claim 10, wherein the hardware processor is further configured to cause one or more search queries that have been recently submitted by the user to be presented in response to initiating an application that searches for media content.

19. A non-transitory computer-readable medium containing computer-executable instructions that, when executed by a processor, cause the processor to perform a method for searching for video content, the method comprising:
- determining (i) a predicted search query based on one or more received characters that have been entered into a first query field and (ii) a suggested search query based on the one or more received characters, wherein the predicted search query and the suggested search query include the one or more received characters;
- causing the predicted search query to be presented in the first query field that is positioned in a first horizontal region and the suggested search query to be presented in a second query field that is positioned in a second horizontal region adjacent to the first horizontal region; and
- in response to selecting one of the suggested search query and the predicted search query, cause a first media content item of a plurality of media content items that are responsive to the suggested selected search query to be presented, wherein a second media content item of the plurality of media content items is presented after the first content item in which the first media content item is inhibited from being presented.

* * * * *